(12) United States Patent
Trotzki et al.

(10) Patent No.: US 6,872,310 B2
(45) Date of Patent: Mar. 29, 2005

(54) PRECOATED FILTER FOR THE FILTRATION OF FLOWING MEDIA

(75) Inventors: Birgit Trotzki, Köln (DE);
Sivagnanam Kandiah, Pulheim (DE);
Rüdiger Lennartz, Pulheim (DE);
Stefan Schmitz, Hürth (DE)

(73) Assignee: Boll & Kirch Filderbzu GmbH (DE)

( * ) Notice: Subject to any disclaimer, the term of this patent is extended or adjusted under 35 U.S.C. 154(b) by 170 days.

(21) Appl. No.: 09/979,782

(22) PCT Filed: Mar. 2, 2001

(86) PCT No.: PCT/EP01/02354
§ 371 (c)(1),
(2), (4) Date: Nov. 5, 2001

(87) PCT Pub. No.: WO01/66222
PCT Pub. Date: Sep. 13, 2001

(65) Prior Publication Data
US 2002/0158002 A1 Oct. 31, 2002

(30) Foreign Application Priority Data
Mar. 4, 2000 (DE) .......................................... 100 10 778

(51) Int. Cl.[7] .............................................. B01D 29/72
(52) U.S. Cl. ........................ 210/332; 210/345; 210/407
(58) Field of Search ...................... 210/323.2, 329–330, 210/332, 345, 407–408, 388, 415, 370, 383, 384–385, 365–366, 785, 107, 374–376, 327–328

(56) References Cited
U.S. PATENT DOCUMENTS 2,731,107 A * 1/1956 Hersey, Jr. .................... 55/283
3,262,568 A * 7/1966 Zehrbach ..................... 210/138
3,310,175 A * 3/1967 McLagan
4,265,771 A * 5/1981 Lennartz et al. ............. 210/769
4,781,825 A * 11/1988 Grimes et al. ............... 210/107
4,804,481 A * 2/1989 Lennartz ..................... 210/791
5,538,630 A * 7/1996 Burns ......................... 210/198
5,944,998 A * 8/1999 Rolchigo et al. ........... 210/645
6,070,739 A * 6/2000 Nagaoka ..................... 210/407

FOREIGN PATENT DOCUMENTS

DE    2828976 A  *  1/1980
DE    4101168 A  *  7/1992

* cited by examiner

Primary Examiner—Terry K. Cecil
(74) Attorney, Agent, or Firm—Orum & Roth

(57) ABSTRACT

In a particularly noise-free and vibration-free operating precoated filter for filtering for example cooling lubricating flowing media, a filter candle surrounding a riser channel is mounted by means of a riser tube in a separating plate in an axially moveable manner. A filter cake adhering to the outside of the filter candle is loosened in such a manner that for example a disk-shaped rotary body comprises a shoulder between the track end and the track start along its track. As soon as a head end piece connected to the riser tube and moveable in an axial manner against the force of a spring is released from the rotating track end, the stored force of the spring accelerates the filter candle, so that the filter cake adhering to the filter candles is loosened by the acceleration of the filter candle and the impact pulse when a dampening ring arranged between the filter candle and the separating plate abuts the separating plate.

25 Claims, 9 Drawing Sheets

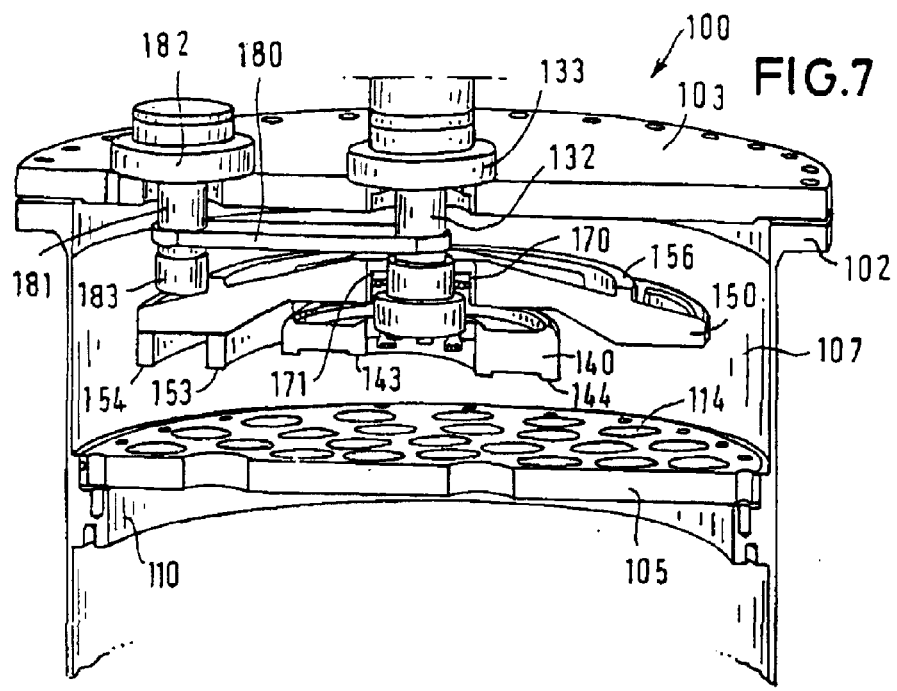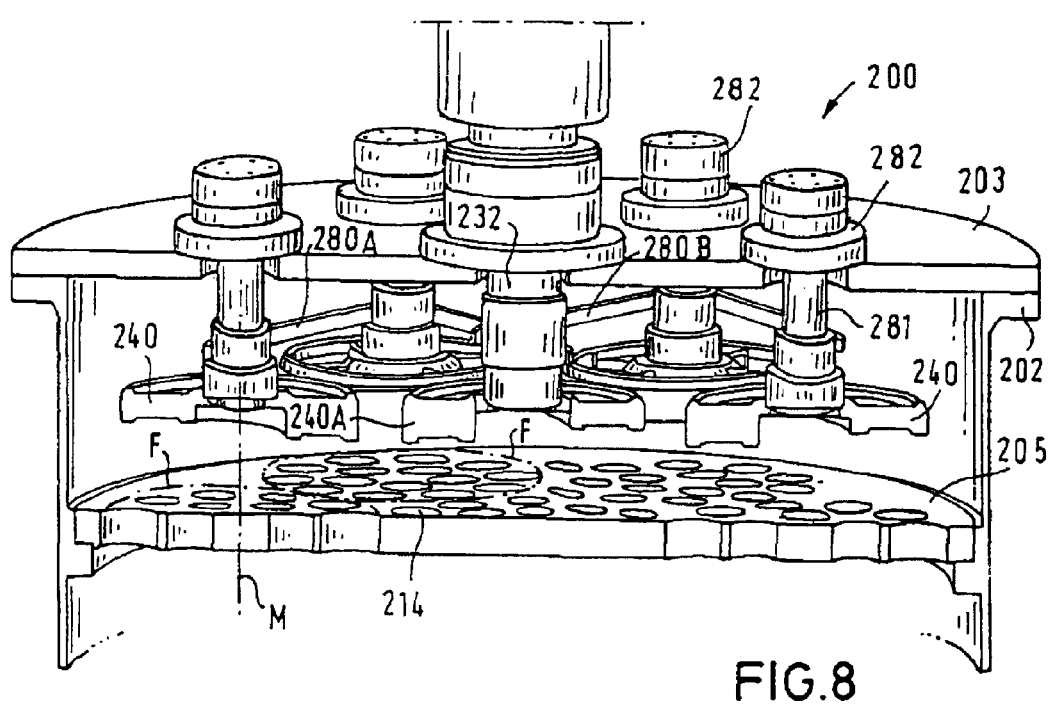

PRECOATED FILTER FOR THE FILTRATION OF FLOWING MEDIA

The invention relates to a precoated filter for the filtration of flowing media, in particular lubricating and cooling lubricating means according to the preamble of claim 1.

From DE-PS 28 28 967 is known a generic precoated filter comprising a separating plate arranged in the filter housing, and which separates the filter housing into a lower filtrant (prefiltration) chamber and an upper filtrate chamber, to which plate are connected filter candles which enclose a riser channel connecting the chambers for catching solids from the medium With this precoated filter, the filter cake consisting of the filtered solids and contaminants deposited at the filter candles is loosened by means of introducing pressurized gas, for example dried to a residual moistness of 50% and is subsequently loosened with a device specially devised therefore. The device for loosening the filter cake consists of a knocking device which is arranged at the head of the filter housing and which comprises a plunger which is guided through a housing passage of the filter housing in a sealed manner and which is coupled to the separating plate. So as to achieve a loosening of the dried filter cake from the filter candles, one has to use forceful impact pulses of the knocking device which lead to noise disturbance and vibrations and impact stresses in the precoated filter. So as to avoid a transfer of the impact and knocking pulses to the plant parts, to which the precoated filters are mounted, the generic precoated filters have to be placed on elastic vibration dampers.

It is a particular object of the invention to create a precoated filter for dry filter cake discharge, which operates in a particularly noise-free and vibration free manner.

This object is solved by the invention given in the preferred embodiment. According to the invention it is provided that the device for loosening the filter cake comprises a rotary body, with which the filter candles can be loaded with a pulse individually or in a group. The measures according to the invention lead to a monumental noise and vibration reduction, as with the pulse produced by means of the device, not the separating plate as a whole, but only individual filter candles, that is, noticeably smaller masses are loaded.

In a preferred embodiment, the rotary body for producing the cleaning pulse comprises at least one shoulder in the form of a step. Due to the shoulder in form of the step, the filter candles which have passed the shoulder edge during a rotation of the rotary body are accelerated. Afterwards, the filter candles abut the separating plate or the rotary body, so that a pulse is produced which is sufficient for loosening the filter cake, on one hand by the acceleration, and on the other hand by the abutment or impact. It is nevertheless preferred that the filter candles do not abut the rotary body when moving backwards, so that the rotary body does not need a special bearing or dampening. For a simple construction of the precoated filter, the rotary body should be arranged in the filtrate chamber.

Preferably it is provided that the filter candles are arranged around a center axis in a concentric manner, whereby the rotary body can comprise a common or a separate circular track with a shoulder in the form of a step for each concentric filter ring. By the arrangement of several filter candles, the filter performance of the precoated filter can be increased. In one embodiment, it can be provided that the tracks are formed in a helical manner. By the helical design, the position of the filter candles is changed continually until the edge of the shoulder of the rotary body passes over the filter candle, so that the acceleration pulse is introduced into the filter candle. With a track increasing continually along the circumference, the filter candles are cleaned once per rotation of the rotary body.

In an alternative embodiment of the precoated filter, the rotary body comprises several shoulders, whereby more shoulders can be arranged on circular paths with a larger radius than on circular paths with a smaller radius. In this embodiment, a higher filter candle density can be used on the circular paths with larger radius, whereby these filter candles are possibly cleaned several times during one rotation of the rotary body.

The rotary body can be a disk, and the one or several shoulders in the tracks form a displacement between the track end and a track start. Preferably, the disk can comprise apertures in the shape of segments in the flat side of the disk, so that part of the filtrate can pass through the disk and can possibly exit by means of an outlet arranged above the rotary body. The latter can alternatively also be achieved in that several helical rings which are connected by radial webs form the rotary body. With a rotary body formed in such a way, recesses are already present due to the construction, so that the filtrate can pass through the rotary body.

A simple construction of the precoated filter and the filter candles results when the riser channel ends in an upper head piece which is mounted at the separating plate in an axially moveable manner and which can be moved in the axial direction by means of the tracks. The rotary body then glides with its tracks along the head pieces and presses against these, until the head pieces have reached the shoulder in the form of a step. The riser channels and the filter candles are continually pushed away from the separating plate during rotation of the track and are preferably pushed into the filtrant chamber. This possibly uniform displacing movement is suddenly reversed when the shoulder in the form of a step has slid past the head pieces. For producing the force for moving the filter candles back, it is preferably provided that an energy store as for example a spring is provided between the head piece or the head end piece and the separating plate, whereby the energy storage device will be loaded by the axial movement of the head pieces.

In a particularly preferred embodiment the head piece is mounted in the separating plate by means of a sleeve which projects from the lower side of the separating plate by means of a sleeve projection. By means of the sleeve projection, a comparatively long guide of the riser tubes or head pieces is achieved in the separating plate, so that the axial guide of the filter candles in the separating plate will not be displaced, even after numerous operating hours. Furthermore, it is advantageous that the filter candles do not immediately abut the separating plate, but the front end faces of the sleeves. For reducing the frictional forces between the rotary body and the head piece or the head end piece, their front ends cooperating with the tracks of the rotary body can be formed in an arcuate manner, preferably semi-spherical.

So as to reduce the vibrations and noises produced when the filter candles return into their starting position, a preferably circular or hollow frustoconical dampening body can also be arranged between the filter candle and the separating plate, which can at least dampen the noise production when the filter candles abut the separating plate intermittently. Furthermore, the separating plate can be mounted in the wall of the housing or can be screwed to a flange ring secured thereto, whereby dampening materials are then arranged between the separating plate and the wall of the housing. By this measure, the noise production is further reduced with a comparatively simple filter construction and simple filter exchange.

Due to the shoulders provided according to the invention for releasing the kinetic energy stored in the springs, only one direction of rotation is allowed for the rotary bodies. The device can suitably comprise a freewheeling arrangement such as a sleeve freewheeling arrangement or a ratchet freewheeling arrangement for the rotary body, which excludes an erroneous function or a wrong direction of rotation of the rotary bodies even after their exchange.

So as to achieve large filter areas, a multiplicity of filter candles can be arranged in a filter housing. With these embodiments, it is recommended that the cleaning mechanism for loosening the solids comprises several rotary bodies, which can preferably be driven by means of a single common drive. For avoiding large speeds, and/or rotary speeds of the rotary bodies, which are unfavorable for the drive or the flow of the rotary bodies, a modular construction can be advantageous with precoated filters having a particularly large total filter area, whereby several filter candles, which are arranged concentrically around a field axis, form a filter candle field, and a rotary body mounted on the housing top on the field axis by means of shaft ends is assigned to each filter candle field. The shafts of the rotary bodies can then be coupled to the centrally arranged drive shaft in a simple and cost effective manner by tensioning means such as cog belts or V-belts or by gear wheels, so as to rotate with the same speed during operation.

In an alternative embodiment, the filter candles can be arranged in a concentric manner around a center axis, and the device comprises two rotary bodies which rotate by means of a gear, preferably a tensioning gear, with different speeds. It is then particularly advantageous to choose the translation of the speed of the gear in such a manner that the rotary bodies comprise the same circumferential velocities, so that unfavorable cross flows or vortices are avoided in the filtrate chamber. With this, it is recommended to connect one rotary body in a non-rotary manner to the drive shaft, and to mount the second rotary body in a rotary manner at the drive shaft.

So as to reduce the operating and servicing costs of the precoated filter in spite of the large friction forces between the track and the head end piece, the cap-shaped head end pieces can glide along the track, and are therefore prone to wear, can be exchanged, and can in particular be formed as screw pins which can be threaded into the cap plates, provided with a rounded head and possibly be hardened at the head. The tracks can preferably be formed by exchangeable ring segment elements which are releasably mounted at the rotary body. The exchangeable elements can also reduce the production costs and costs of spare parts if they are used with precoated filters having different housing dimensions, that is, with rotary bodies having different widths. Every rotary body can advantageously comprise at least two wings, mounting plates or the like, which are mounted in an oblique manner to one another and to the separating plate and/or two counter-rotating obliques for mounting the exchangeable elements, so that the ring segments can comprise a uniform depth respectively, and the storage of the kinetic drive energy for the cleaning pulse is achieved by the angled position of the wings or obliques of the rotary body.

Further advantages and embodiments of the invention result from the following description of the drawing, in which exemplary examples are illustrated.

Figure 2B:
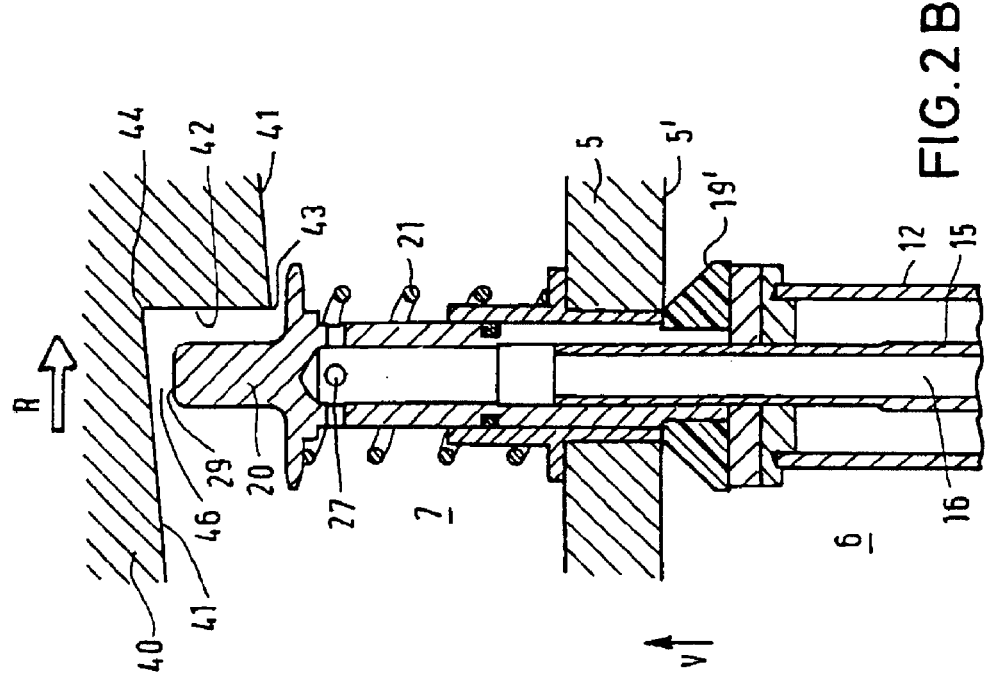
FIG. 2A is a detailed section of a filter candle mounted in the separating plate before the introduction of the pulse.
Figure 2A:
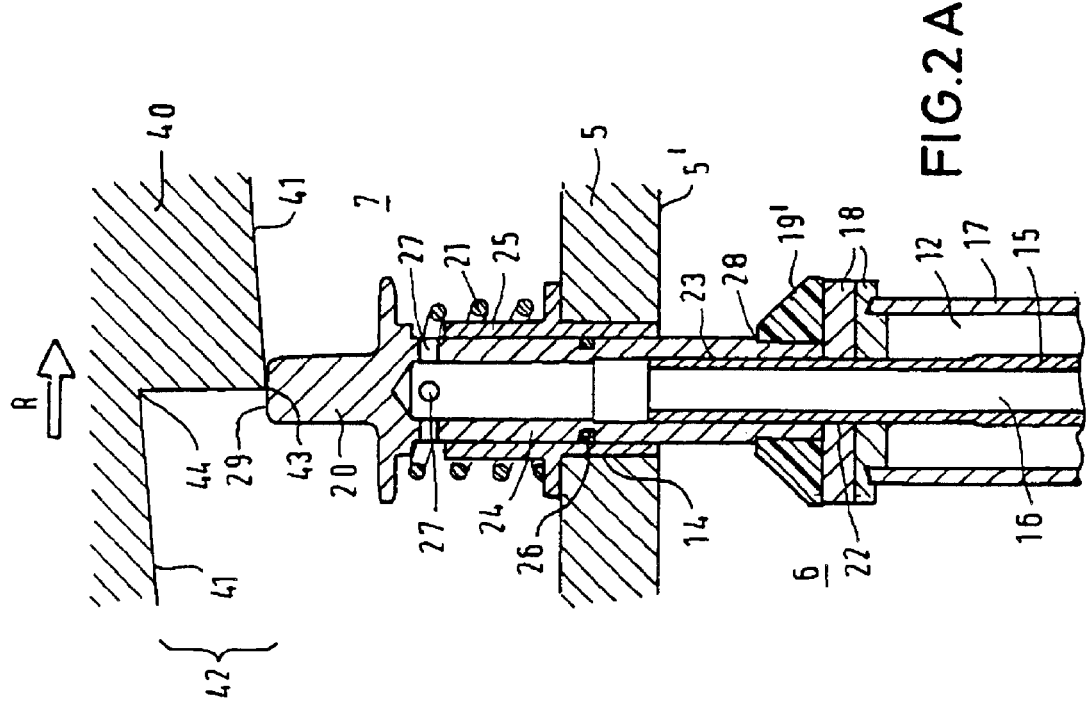
Figure 3:
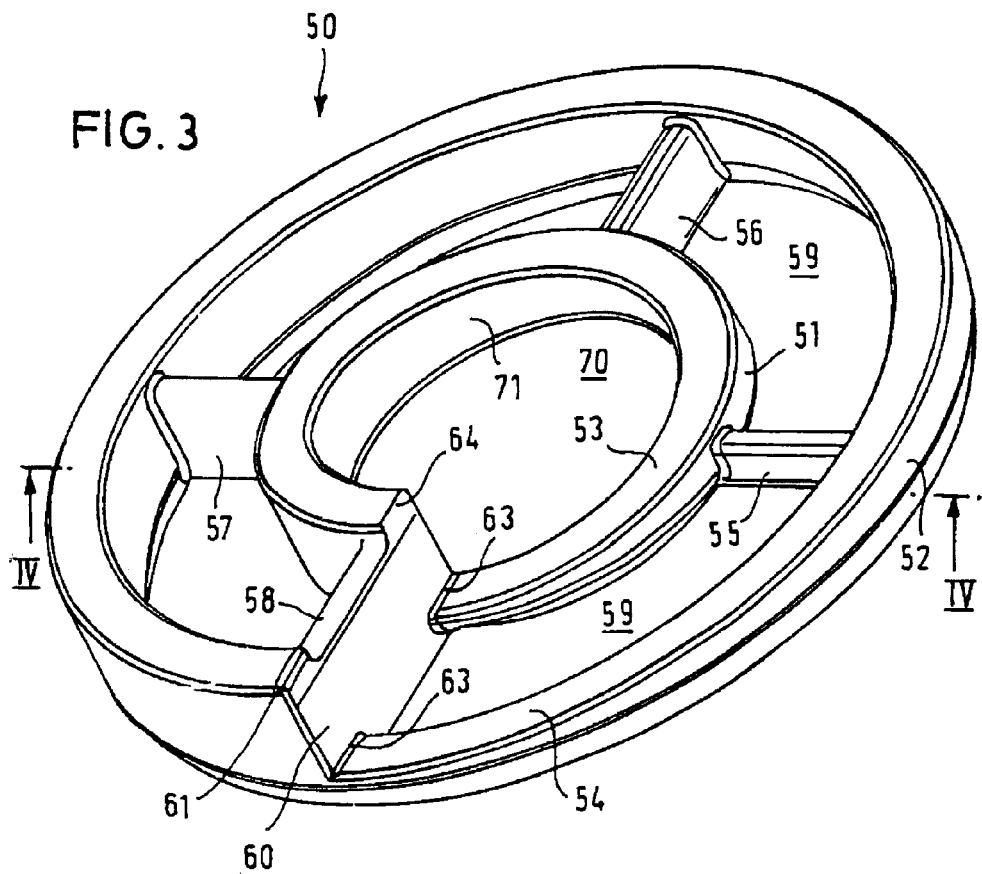
Figure 4:
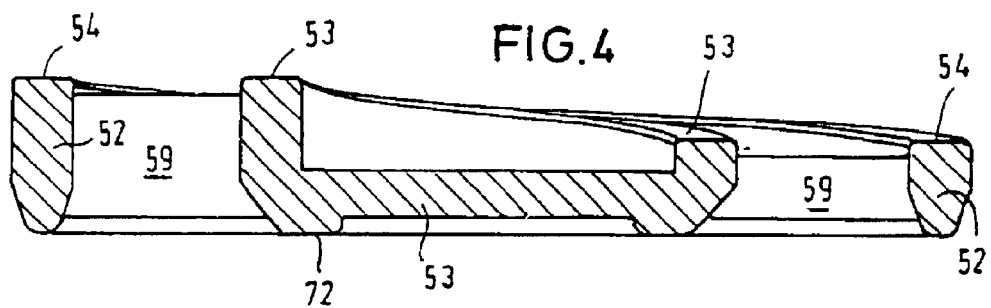
Figure 5:
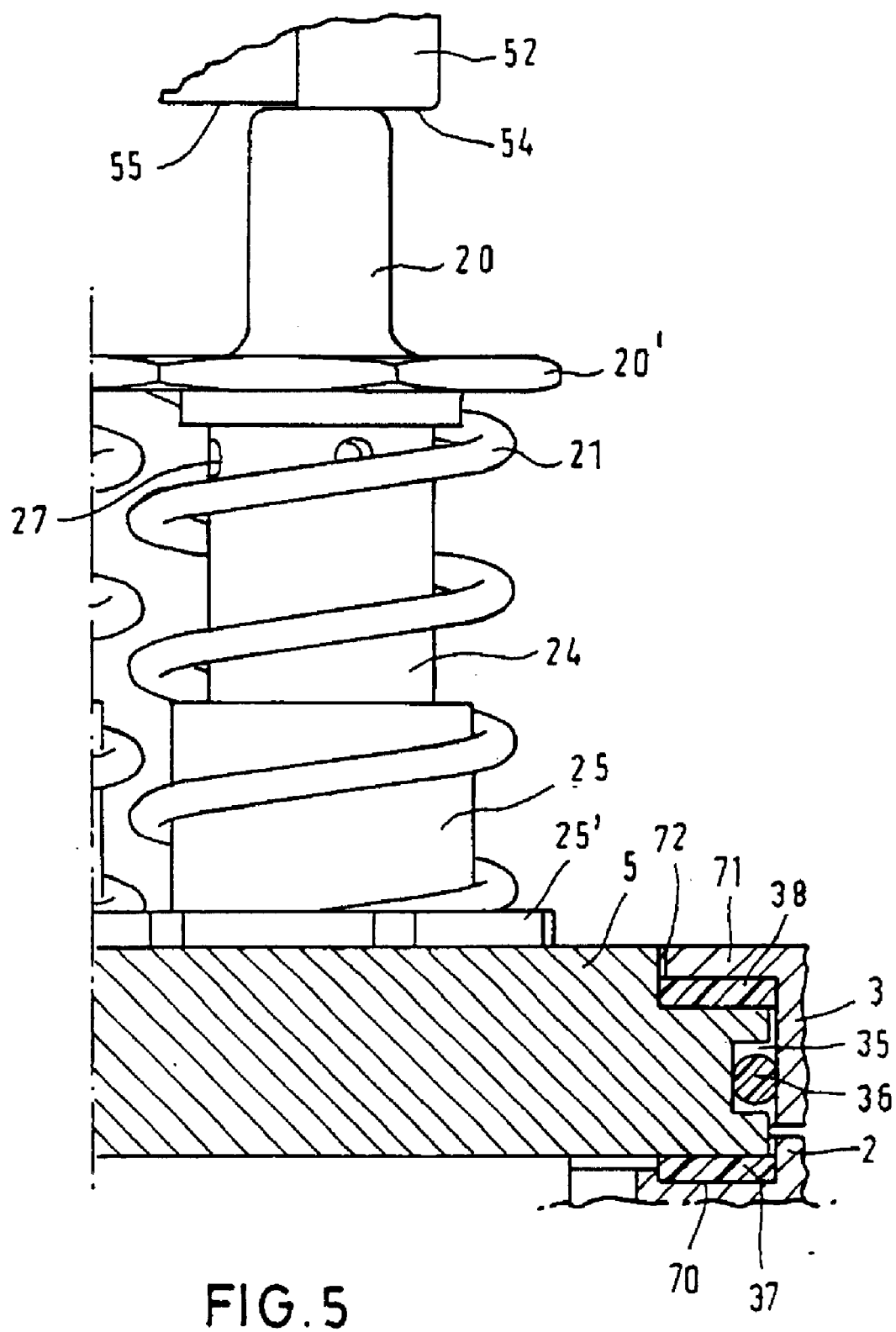
Figure 6A:
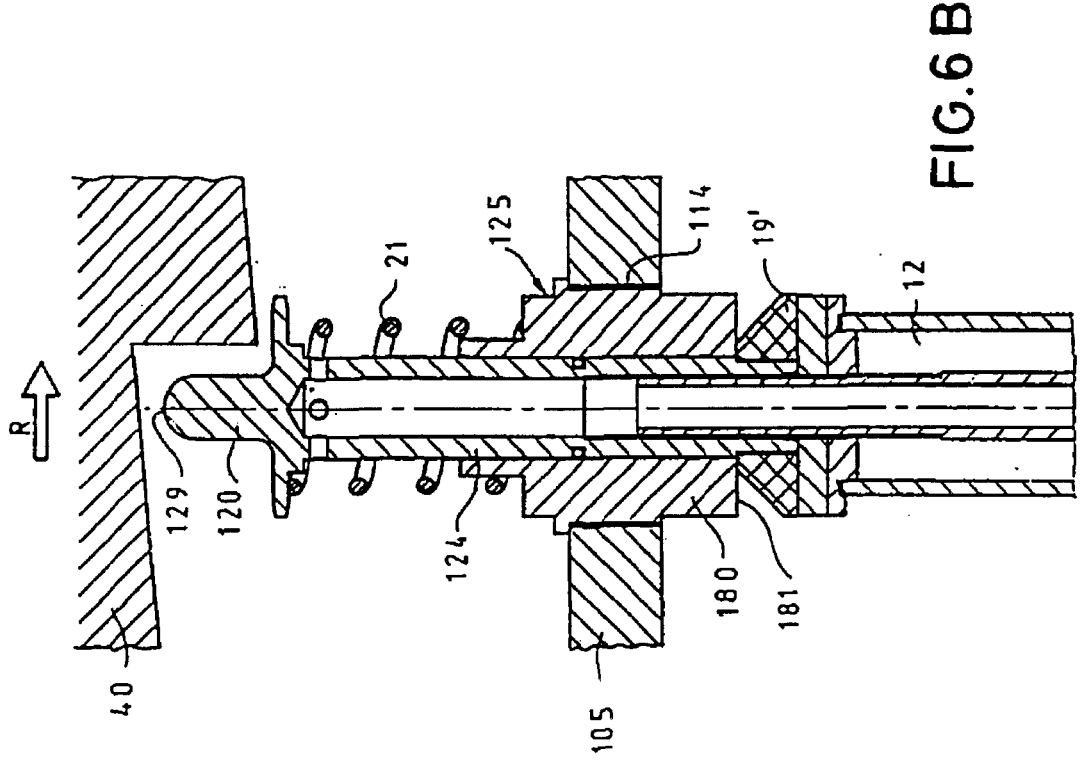
Figure 6B:
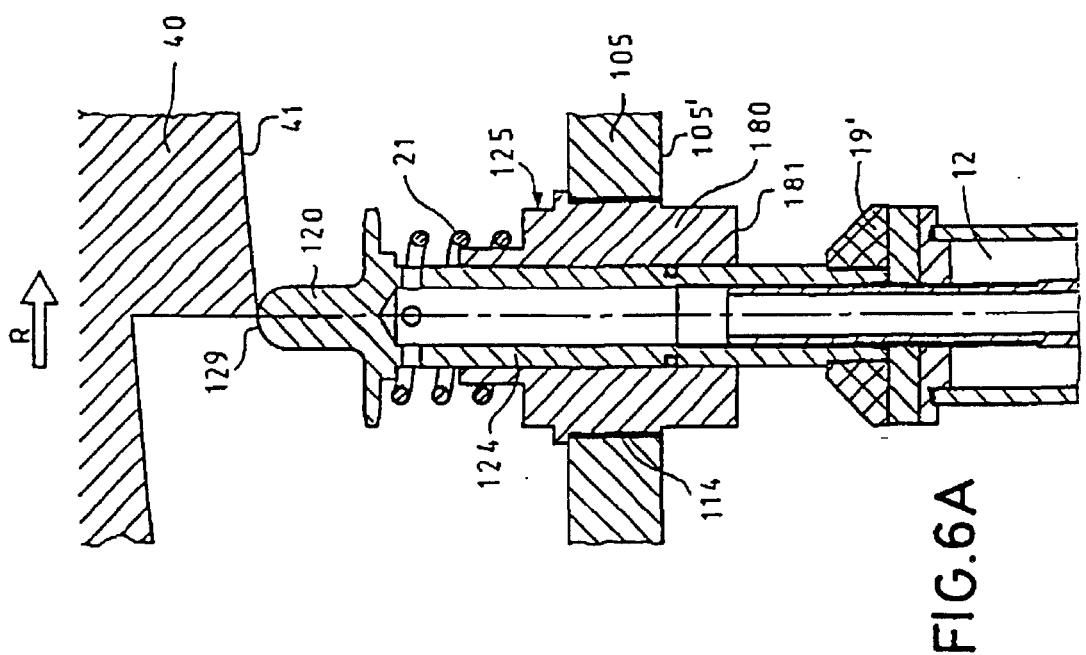
Figure 9:
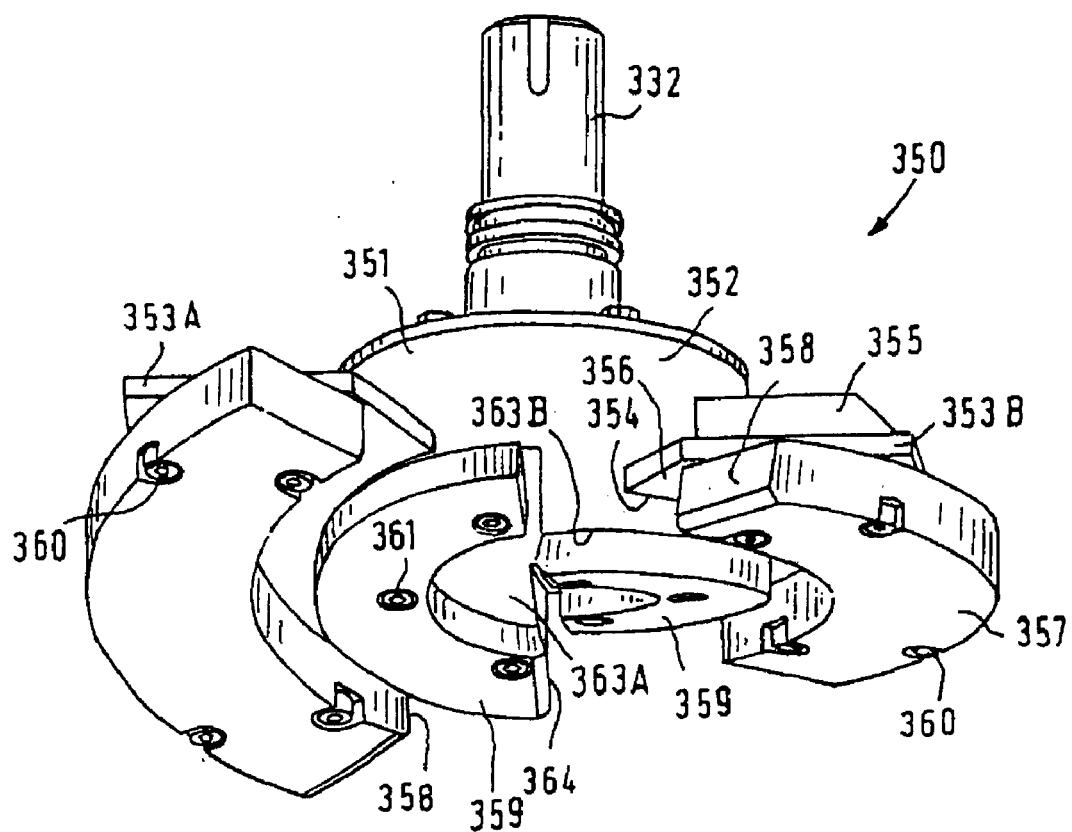

FIG. 2B ist the view from FIG. 2A immediately after the introduction of the pulse;

FIG. 3 is a perspective embodiment of a rotary body;

FIG. 4 is a sectional view according to IV—IV in FIG. 3;

FIG. 5 is the mounting of the separating plate in the wall of the housing;

FIG. 6A is a second embodiment of the filter candle mounting according to FIG. 2A;

FIG. 6B is the embodiment according to FIG. 6A immediately after the introduction of the pulse;

FIG. 7 is the construction and drive concept for a modified precoated filter having two rotary bodies;

FIG. 8 is the construction and drive concept for a modular precoated filter having several rotary bodies and a large total filter area; and FIG. 9 is an alternative embodiment for a rotary body with exchangeable tracks.

Figure 10:
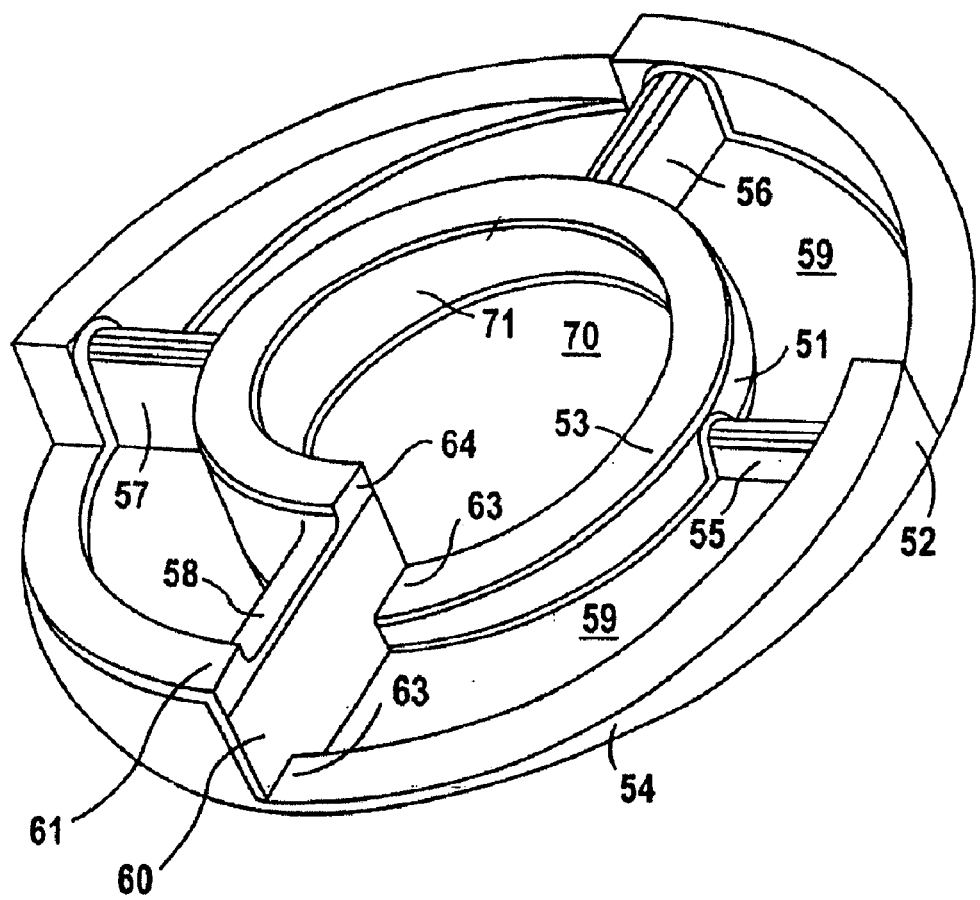

FIG. 10 is a perspective view of an alternative embodiment of the rotary body.

Figure 11B:
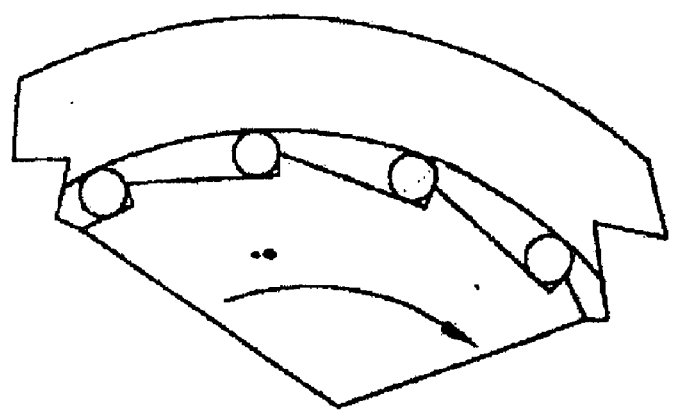
Figure 11A:
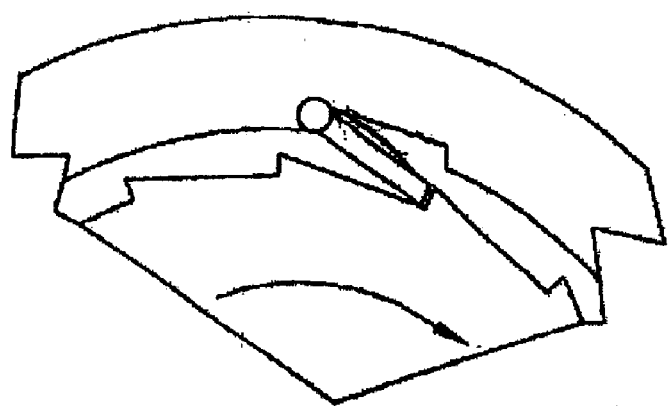

FIGS. 11a–11b are freewheeling arrangements.

The precoated filter shown schematically and designated as 10 for filtering of for example lubricating means or cooling lubricating means comprises a cylindrical filter housing 1 with a lower housing part 2 and an upper housing part 3. The two housing parts 2,3 are connected to one another in a detachable manner by means of a threaded flange 4. A separating plate 5 arranged in the inside of the filter housing 10 in the separating plane between the lower housing part 2 and the upper housing part 3 divides the inner chamber of the filter housing 1 into a lower filtrant chamber 6 and an upper filtrate chamber 7. An inlet 8 leads into the filtrant chamber 6 for the medium to be filtered. Correspondingly, the filtrate chamber 7 comprises an outlet 9, so as to let the filtered filtrate flow back for example into a lubricating means cycle, not shown. At the bottom of the lower part 2 of the housing is arranged a pivotal throttle valve 11, so as to be able to discharge the filter cake 13 which was previously dried by means of a drying device, not shown, i.e. an introduction of pressurized gas.

The separating plate 5 is realized as a sieve plate with a corresponding number of bores 14 arranged concentrically around the center axis A. The bores 14 are passed through by riser tubes 15, which are enclosed by filter candles 12 below the separating plate 5, so that filtered liquid enters the inner chamber of the filter candles 12 through the filter fabric of the filter candles 12, rise in a riser channel 16 of the riser tubes 15 and can transgress into the filtrate chamber 7 as filtered filtrate by means of exit bores 27 (FIG. 5), not shown in FIG. 1. Thereby, the riser channel 16 connects the filtrant chamber 6 and the filtrate chamber 7. The individual filter candles 12 are mounted in the sealed bores 14 in an axially moveable manner by means of the riser tubes, as will be explained further.

Figure 1:
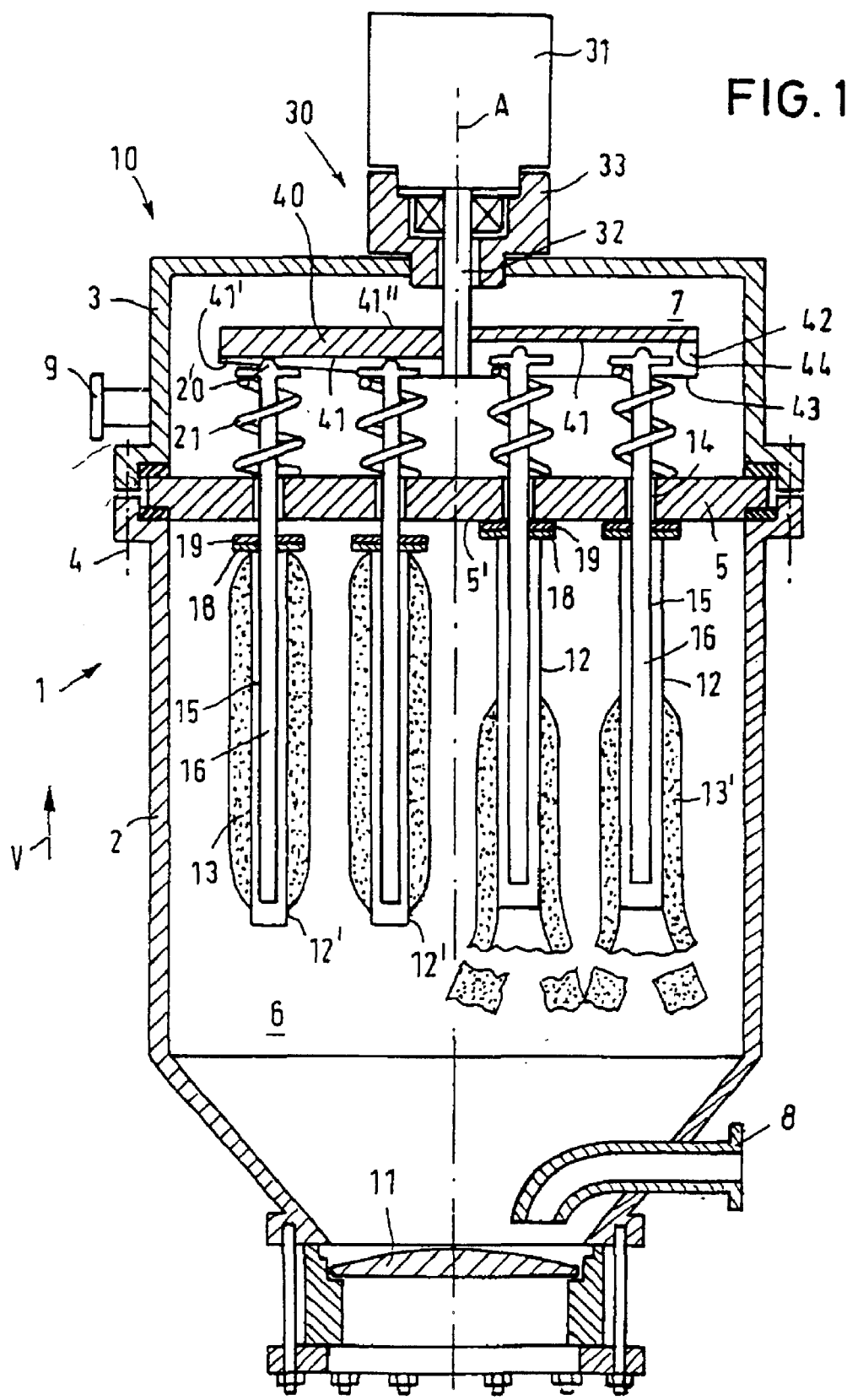
FIG. 1 is a schematic cross-section through a precoated filter according to the invention.

The filter candles 12' on the left side in FIG. 1 are displaced axially further into the filtrant chamber 6 relative to the filter candles 12 on the right side of FIG. 1, so that the stop formed by a head plate 18 and a dampening ring 19 of the filter candles 12 is spaced in the left half of FIG. 1 from the lower side 5' of the separating plate 5, while the dampening ring 19 lies immediately at the lower side 5' of the separating plate 5, with the filter candles 12 shown on the right side of FIG. 1. So as to provide an energy storage device and to bias the filter candles 12, 12' in their hanging arrangement inside the filter housing 1, springs 21 are arranged between the separating plate 5 and the cap-shaped head end sections 20 of the riser tubes 15 within the filtrate chamber 7. The axial movement (backward movement) of the filter candles 12 is limited in the direction V of the arrow by means of the stop formed by the dampening ring 19 and the head plate 18.

As FIG. 1 shows further, a filter cake 13 adheres to the outer circumference of the filter candles 12' on the left side of FIG. 1, while the filter cake 13' of the filter candles 12 shown on the right side of FIG. 1 was already loosened. So as to achieve the loosening of the filter cake 13', and therewith a cleaning of the precoated filter 10, a cleaning device designated as 30 is provided, which includes an electronic drive 31 arranged outside the upper part 3 of the filter housing, the drive shaft 32 of which is mounted in a rotary passage 33 arranged centrally at the upper part 3 of the filter housing. The lower end of the drive shaft 32 is connected to a rotating disk in a non-rotary manner, which can rotate within the filtrate chamber 7. The disk 40 comprises, as can schematically be seen in FIG. 1, a helical track 41 at the lower flat side 41' of the disk, so that a shoulder 42 in the form of a step climbs between a track start designated as 44 and a track end designated as 43. The shoulder 42 formed at a right angle to a back side 41" of the disk forms thereby a displacement between the track start 44 and the track end 43, as can be seen schematically in the right half of FIG. 1.

As the disk 40 rotates, the head pieces 20 glide with their front ends 29 along tracks 41 and are continually lifted by the helical climb of the track from the position according to FIG. 1 in the right half to the position in left half shown in FIG. 1, until they abut the track end 43 with the head end pieces 20 when the spring 21 is fully tensioned. This state can best be seen in FIG. 2A, which is referred to now. The cap-shaped head end piece 20 has been displaced towards the separating plate 5 during the rotary movement of the disk 40 in the direction R of the arrow by means of the continually decreasing distance between the separating wall 5 and the track 41 against the force of the spring 21, so that, according to FIG. 2A, the filter candle 12 or the frustoconical sealing ring 19' has reached its maximal distance from the lower side 5' of the separating plate 5. As the disk 40 rotates, the disk 40 reaches the position shown in FIG. 2B immediately thereafter. The head end section 20 does not abut the track 41 anymore, as the track end 43 has moved away. The spring force previously stored in the spring 21 can unload in the direction V of the arrow, and the filter candle 12, together with the riser tube 15 and the head end section 20 can accelerate in the direction V of the arrow. This acceleration pulse is abruptly slowed down when the filter candle 12 with the frustoconical dampening ring 19' abuts the lower side 5' of the separating plate 5.

This state is shown in FIG. 2B as well as in the right half of FIG. 1, to which it is referred to again. As be seen in FIG. 1, the filter cake 13' is loosened from the outer casing of the filter candles 12, on the one hand by means of the acceleration movement of the filter candles 12, on the other hand by the abutment pulse of the filter candle 12 against the lower side 5' of the separating plate 5, so that it falls downwards and can be discharged via the throttle valve 11. In the embodiments shown, the distance between the track start 44 and the separating plate 5 is dimensioned in such a way that the head end pieces 20 at the end of the backward movement do not abut the rotary body 40, that is, that no pulse is transferred to the rotary disk. Therefore, it is preferably provided that a gap 46 remains between the front end 29 and the track region 41 close to the track start 44, when the filter candles 12 return to their starting plates.

As the disk 40 driven by the electronic drive 31 moves away continually, all filter candles 12, 12' arranged in the filter housing are initially pretensioned by means of the climbing track 41 during a revolution of the disk 40 of 360°, are afterwards loaded by the shoulder 42 in the form of a step by means of a pulse, so that the filter cake 13, 13' can fall off from all the filter candles 12. As the filter candles are only loaded with the pulse individually or in a group, the noise disturbance as well as the vibrations produced during cleaning are noticeably smaller than in the state of the art. This result is achieved in particular by the use of the rotary body (disk 40) with a shoulder 42 in the form of a step.

The construction and the mounting of the filter candles at the separating plate 5 is now explained in more detail with regard to FIGS. 2A and 2B. As FIGS. 2A, 2B show, the filter fabrics 17 of the filter candles 12 enclose a hollow riser tube 15 which comprises a riser channel designated as 16 on the inside. The filter fabrics 17 of the filter candles 12 are closed at their ends, and are mounted at their upper ends, shown in FIGS. 2A and 2B, to a multi-piece head plate 18 provided with an inner thread 22. The riser tube 15 comprises an outer thread 23 at its upper end, so that the head plate 18 and the riser tube 23 can be screwed to one another. A head section 24 is screwed to the outer thread 23, which is mounted in a sleeve 25 in an axially moveable manner, which is screwed into a bore 14 of the separating plate 5. An O-ring 26 prevents that liquid can pass between the sleeve 25 and the head section 24. The riser channel 16 discharges into exit bores 27 which are distributed around the circumference and from which filtrate flows into the filtrate chamber 7. The hollow frustoconical dampening body 19' is clamped between the head plate 18 and an annular shoulder 28 at the lower end of the head section 24.

FIGS. 3 and 4 show an alternative embodiment for a rotary body The rotary body designated as 50 is for example produced as a molded part made of metal and comprises an inner helical ring 51 and an outer helical ring 52, which form tracks 53 or 54 with their upper front areas. The rings 51, 52 are connected by radial webs 55, 56, 57, 58, so that recesses 59 in the shape of segments result between two webs 55, 56, 57, 58. In FIG. 3 a shoulder 60 in the form of a step can be seen, which is added to the shoulder edge 61. The shoulder 60 forms the transition between the track starts 63 and the track ends 64, which coincide with the shoulder edge 61. The drive coupling of the rotary body 50 to the drive shaft of the electronic drive takes place at the center hole 70, for example at its peripheral wall 71 or at the back side of the peripheral wall 71 in a manner not shown. The helical tracks 52, 53 effect the displacement and pretensioning of the filter candles or head end pieces of the filter candles such as the loading of the springs 21, as has previously been explained with regard to FIGS. 1 and 2A, 2B.

FIG. 5 shows the positioning of the separating plate 5 in the dividing plane between the lower end 2 of the housing and the upper end 3 of the housing in an exemplary manner. The separating plate 5 comprises an annular groove 35 at its outer circumference, in which an O-ring 36 is arranged, so as to seal the separating plate 5 at the circumference against the upper part 3 of the housing. So as to dampen the vibrations and noises produced when the filter candles 12, not shown here, abut the separating plate, a first dampening ring 37 is inserted between the upper front end 70 of the lower part 2 of the housing and the separating plate 5, and a second dampening ring 38 is inserted between a radial shoulder 71 of the upper part 3 of the housing and the separating plate 5. The separating plate 5 comprises a ring-shaped recess facing the radial shoulder 71. FIG. 5 also shows that the cap-shaped head end section 20 of the head section 24 comprises a cap plate 20' formed as a nut and that the sleeve 25 is also provided with a nut having several edges, with which the filter candles can be mounted or dismounted in the bores of the separating plate, not shown here.

FIGS. 6A, 6B show a particularly advantageous and reliable embodiment for the filter candles and their positioning in the separating plate 105. Parts different from the above description are provided with reference numerals which are increased by 100. The bores 114 in the separating plate 105 have a diameter which is the same or larger than the outer diameter of the filter candles 12 or the dampening rings 19'. Sleeves 125 with relatively solid sleeve walls are screwed into the bores 114. The sleeves 125 comprise sleeve projections 180 in one piece which project beyond the lower side 105' of the separating plate. The sleeve projections 180 provide a relatively long guide of the head pieces 124, so that, even after numerous cleaning pulses, the filter candles 12 in the separating plates 105 do not move about. As particularly shown in FIG. 6B, the widening and the elongation of the sleeves 125 also effects that the dampening rings 19' abut the front end sides 181 of the sleeve projections 180, and therefore no more the lower side 105' of the plate. Furthermore, the friction contact between the head pieces 124 or the head end pieces 120 and the tracks 41 of the rotary bodies 40 is reduced considerably. That is, the head end pieces 120 with their front ends 129 cooperate with the tracks 41 only at points.

FIG. 7 shows a precoated filter 100 with a separating plate 105, which is mounted with a distance underneath the separating plane between the lower part 102 of the housing and the upper part 103 of the housing forming the top to a flange ring 110 formed in the inside of the lower part 102 of the housing and comprises bores 114 which are arranged concentrically around a center axis, into which are mounted filter candles, not shown; the mounting and arrangement of the filter candles being identical to the embodiment described above. Two rotary bodies 140, 150 are arranged in the filtrate chamber 107, which have essentially, with regard to the tracks 143, 144, 153, 154, shoulders and a cleaning pulse production with the same construction and the same mode of operation as the rotary body described with regard to FIG. 3, so that a new description does not have to take place. The inner rotary body 140 rotates in the ring area spanned by the outer rotary body 150 and its tracks 143, 144 are assigned to filter candles arranged on inner filter cycle paths. In the shown embodiment, the inner rotary body 140 is connected to a drive shaft 132 in a non-rotary manner, which passes centrally through the top 103 of the housing, is mounted thereto with the sealing shaft passage 133, and is driven by means of the electronic drive, not shown. The outer rotary body 150 is mounted at a shaft shoulder 134 of the drive shaft 132 in a suitable manner by means of the ball bearings 171 mounted in the center hole 170, so that it can rotate freely around the drive shaft 132. The rotary bodies 140, 150 are coupled to one another by means of a gear drive shown by means of belts 180; the belt 180 surrounds the shaft of the drive shaft 132 and the shaft of a transmission shaft 181 which is mounted by means of a mounting arrangement 182 to the top 102 of the housing. The lower end 183 of the transmission shaft 181 is provided with external teeth engaging a tooth comb 156 at the back of the rotary body 150, so as to transfer the rotation of the drive shaft 132 to the outer rotary body 150. With the gear, a speed translation is produced which is chosen in such a way that the circumferential velocities of the inner rotary body 140 and of the outer rotary body 150 are about the same, that is, a speed translation which is reciprocal to the ratio of the diameters of the rotary bodies 140, 150. By this measure, the circumferential velocity of the outer rotary body can be reduced to a size which is acceptable for flow and drive, even with several filter cycles.

FIG. 8 shows a precoated filter 200 having a large filtration performance due to the large dimensions and the large number of filter candles. As with the previously described embodiment, a separating plate 205 is supported on a flange ring 207 in the lower part 202 or the housing. The bores 214 receiving the filter candles are arranged concentrically around a corresponding field center axis M with their filter candle fields F shown by dotted lines A rotary body 240 is assigned to each filter candle field F, which is connected in a non-rotary manner to a shaft end 281 which is arranged on the center axis by means of the bearing arrangement 282 at the top 203 of the housing. In FIG. 8 several filter candle fields F and rotary bodies 240 are arranged symmetrically around the central rotary body 240A, which is connected to the drive shaft 232. The rotary bodies 240, 240A have an identical construction and their functional operation corresponds to that of the rotary bodies described with regard to FIG. 3. By means of the modular construction using several rotary bodies 240, the number of the present filter candles is hardly limited. The circumferential velocities of the individual rotary bodies 240 are relatively low and are coupled to their speed by means of the shaft ends 281 and the drive shaft 232 surrounding the transfer belts 280A, 280B.

FIG. 9 shows a further alternative embodiment of a rotary body 350, which can be used with all previously described embodiments of the precoated filter. The rotary body 350 consists of a cylinder body 351 connected to the drive shaft 332 in a non-rotary manner, at the outer wall 352 of which are secured wing-shaped mounting plates 353A, 353B. The cylindrically formed inner sides 354 of the mounting plates 353A, 353B abut the outer wall 352, whereby supporting ribs 355 are welded, adhered or formed between the upper sides if the mounting plates 353A, 353B and the outer wall for stiffening the connection. The mounting plates 353A, 353B are arranged in an angular manner to one another and to a plane perpendicular to the drive shaft axis, so that they are oblique to the separating plate, not shown, in the mounting state of the rotary body 350. Ring segment elements 357 (claws) are arranged in an exchangeable manner at the lower sides facing the separating plates by means of screws 360 which form tracks for the head end pieces of the filter candles during operation. For filter candles which are arranged further inwardly, the rotary body comprises separate ring segment elements 359, the dimensions and radii of which are smaller than those of the ring segment elements 357. For mounting these inner ring segment elements 357 by means of screws 361 at the desired angle, the lower side of the cylinder is provided with two counter-rotating obliques 363A, 363B, each forming a half of the lower side of the cylinder, the declination essentially corresponding to the declination of the mounting plates 353A, 353B. Due to the angular mounting of the mounting plates or the obliques, the head end pieces of the filter candles can contact the tracks without impact and are then pressed downwards with progressing rotation of the rotary body 350 while storing the energy necessary for the cleaning pulse in the energy storage device until they reach the corresponding element end 358, 364, that is, the end of the corresponding tracks, and transform the kinetic energy stored in the energy storage device into movement energy.

Due to the shoulders provided according to the invention for releasing the kinetic energy stored in the springs, only one direction of rotation is allowed for the bodies. The device can suitably comprise a freewheeling arrangement for the rotary body such as a sleeve freewheeling arrangement or a ratchet freewheeling arrangement as shown in, a freewheeling arrangement prevents an erroneous function or a wrong direction of rotation of the rotary bodies even after their exchange.

It is clear that preferred exemplary embodiments were explained here. Not shown, but part of the protection, should also be embodiments in which several shoulders in the form of steps are arranged along a track or on the flat side facing the head end sections of the rotary bodies. The shoulders can also be formed by cams or the like or with a steep tear-off edge. There are numerous variations for the construction of the housing and the arrangement of the seals for the expert, which shall be included in the protection. The outlet can also be arranged outside the housing, in which an exit cross-section is provided in or behind the rotary passage. The separating plate can also be screwed against a flange ring with intermediate positioning of the dampening materials, which is secured or formed at the inner side of the housing. With this embodiment, the separating plate is then not in but below the dividing plane of the housing parts, and the second housing part serves as the upper closing top.

What is claimed is:

1. Precoated filter for filtering flowing media, in particular lubricating and cooling lubricating media, comprising
    (i) a separating plate arranged in a filter housing and separating the filter housing into a lower filtrant chamber and an upper filtrate chamber, to which are connected filter candles in which each enclose a riser channel connecting the chambers for catching contaminations or solids from a medium, and
    (ii) a device for loosening the solids dried to a filter cake, characterized in that the device comprises a rotary body with which the filter candles can be loaded with a pulse individually or in a group characterized in that the rotary body for producing the pulse comprises at least one shoulder in the form of a step for producing the pulse.

2. Precoated filter according to claim 1, characterized in that the rotary body is arranged in the upper filtrate chamber.

3. Precoated filter according to claim 1, characterized in that several helical rings which are connected by radial webs form the rotary body.

4. Precoated filter according to claim 1, characterized in that the separating plate is mounted in a mounting wall of the housing or in a flange ring formed or secured at the mounting wall of the housing, whereby dampening rings are arranged between the separating plate and the wall of the housing or the flange ring.

5. Precoated filter according to claim 1, characterized in that the rotary body can be driven by means of an electronic drive arranged outside of the housing.

6. Precoated filter according to claim 1, characterized in that the device for loosening the solids comprises several rotary bodies which can preferably be driven by means of a single common drive.

7. Precoated filter for filtering flowing media, in particular lubricating and cooling lubricating media, comprising
    (i) a separating plate arranged in a filter housing and separating the filter housing into a lower filtrant chamber and an upper filtrate chamber, to which are connected filter candles in which each enclose a riser channel connecting the chambers for catching contaminations or solids from a medium, and
    (ii) a device for loosening the solids dried to a filter cake, characterized in that the device comprises a rotary body with which the filter candles can be loaded with a pulse individually or in a group characterized in that the filter candles are arranged in a concentric manner around a center axis forming concentric filter rings, whereby the rotary body comprises a circular track with a shoulder in the form of a step for each concentric filter ring.

8. Precoated filter according to claim 7, characterized in that the tracks have a helical shape.

9. Precoated filter for filtering flowing media, in particular lubricating and cooling lubricating media, comprising
    (i) a separating plate arranged in a filter housing and separating the filter housing into a lower filtrant chamber and an upper filtrate chamber, to which are connected filter candles in which each enclose a riser channel connecting the chambers for catching contaminations or solids from a medium, and
    (ii) a device for loosening the solids dried to a filter cake, characterized in that the device comprises a rotary body with which the filter candles can be loaded with a pulse individually or in a group the rotary body comprises several shoulders, whereby tracks with a larger radius have arranged thereon more shoulders than tracks with a smaller radius.

10. Precoated filter according to claim 9, characterized in that the riser channel ends are in an upper head piece which is mounted to the separating plate in an axially moveable manner, and which can be moved in the axial direction by means of the tracks.

11. Precoated filter according to claim 10, characterized in that an energy storage device is provided between the head piece or a head end piece and the separating plate which can be loaded by the axial movement of the riser channel.

12. Precoated filter according to claim 11 wherein the energy storage device is a spring.

13. Precoated filter according to claim 10, characterized in that the head piece is mounted in the separating plate by means of a sleeve, which projects beyond a lower side of the separating plate by means of a sleeve projection.

14. Precoated filter according to claim 13, wherein said sleeve has a sleeve front face and characterized in that a ring-shaped or hollow frustoconical dampening body is arranged between at least one of the filter candles and the separating plate or the sleeve front face.

15. Precoated filter according to claim 10, characterized in that the head piece or the head end piece comprises a semi-spherical arcuate front end cooperating with the rotary body.

16. Precoated filter for filtering flowing media, in particular lubricating and cooling lubricating media, comprising
    (i) a separating plate arranged in a filter housing and separating the filter housing into a lower filtrant chamber and an upper filtrate chamber, to which are connected filter candles in which each enclose a riser channel connecting the chambers for catching contaminations or solids from a medium, and
    (ii) a device for loosening the solids dried to a filter cake, characterized in that the device comprises a rotary body with which the filter candles can be loaded with a pulse individually or in a group characterized in that the rotary body is a disk having at least one shoulder and the shoulder or the shoulders form a displacement between track parts at a flat side of the disk, said flat side formed at the track parts.

17. Precoated filter according to claim 16, characterized in that the disk comprises apertures in the shape of segments in the flat side of the disk.

18. Precoated filter for filtering flowing media, in particular lubricating and cooling lubricating media, comprising (i) a separating plate arranged in a filter housing and separating the filter housing into a lower filtrant chamber and an upper filtrate chamber, to which are connected filter candles in which each enclose a riser channel connecting the chambers for catching contaminations or solids from a medium, and (ii) a device for loosening the solids dried to a filter cake, characterized in that the device comprises a rotary body with which the filter candles can be loaded with a pulse individually or in a group, said rotary body comprising a plurality of tracks characterized in that the tracks climb continually from a track start to a track end.

19. Precoated filter for filtering flowing media, in particular lubricating and cooling lubricating media, comprising (i) a separating plate arranged in a filter housing and separating the filter housing into a lower filtrant chamber and an upper filtrate chamber, to which are connected filter candles in which each enclose a riser channel connecting the chambers for catching contaminations or solids from a medium, and (ii) a device for loosening the solids dried to a filter cake, characterized in that the device comprises a rotary body with which the filter candles can be loaded with a pulse individually or in a group characterized in that the device comprises a freewheeling arrangement for the rotary body.

20. Precoated filter according to claim 19 wherein the freewheeling arrangement is selected from the group consisting of a sleeve freewheeling arrangement and a ratchet freewheeling arrangement.

21. Precoated filter for filtering flowing media, in particular lubricating and cooling lubricating media, comprising (i) a separating plate arranged in a filter housing and separating the filter housing into a lower filtrant chamber and an upper filtrate chamber, to which are connected filter candles in which each enclose a riser channel connecting the chambers for catching contaminations or solids from a medium, and (ii) a device for loosening the solids dried to a filter cake, characterized in that the device comprises a rotary body with which the filter candles can be loaded with a pulse individually or in a group characterized by a modular construction, whereby several filter candles which are arranged concentrically around a field axis form a filter candle field, and each of a plurality of rotary bodies are mounted on the field axis by means of shaft ends at the top of the housing and are assigned to each candle field, whereby the shafts of the rotary bodies are coupled to a centrally arranged drive shaft by tensioning means and circulate with the same speeds during rotation.

22. Precoated filter for filtering flowing media, in particular lubricating and cooling lubricating media, comprising (i) a separating plate arranged in a filter housing and separating the filter housing into a lower filtrant chamber and an upper filtrate chamber, to which are connected filter candles in which each enclose a riser channel connecting the chambers for catching contaminations or solids from a medium, and (ii) a device for loosening the solids dried to a filter cake, characterized in that the device comprises a rotary body with which the filter candles can be loaded with a pulse individually or in a group characterized in that the filter candles are arranged concentrically around a center axis and that the device comprises two rotary bodies which rotate by means of a gear, with said gear having different speeds, whereby the speed translation of the gear is chosen in such way that the rotary bodies comprise the same circumferential speeds.

23. Precoated filter according to claim 22, characterized in that one rotary body is connected to the drive shaft in a non-rotary manner and the second rotary body is mounted at the drive shaft in a rotary manner.

24. Precoated filter for filtering flowing media, in particular lubricating and cooling lubricating media, comprising (i) a separating plate arranged in a filter housing and separating the filter housing into a lower filtrant chamber and an upper filtrate chamber, to which are connected filter candles in which each enclose a riser channel connecting the chambers for catching contaminations or solids from a medium, and (ii) a device for loosening the solids dried to a filter cake, characterized in that the device comprises a rotary body with which the filter candles can be loaded with a pulse individually or in a group characterized in that head end pieces comprise screw pins provided with a rounded head, the screw pins screwed into cap end plates and the screw pins can be exchanged and are formed in as screw pins which can be screwed into the cap plates, provided with a rounded head and/or that tracks are formed by exchangeable ring segment elements which are secured to the rotary body in a detachable manner.

25. Precoated filter according to claim 24, characterized in that the rotary body comprises at least two mounting plates which are oblique to one another and to the separating plate, and/or two oblique elements and said mounting plates and/or said obliques elements are arranged in a counter-rotating manner with regard to one another for securing the exchangeable elements.

* * * * *

UNITED STATES PATENT AND TRADEMARK OFFICE
CERTIFICATE OF CORRECTION

PATENT NO. : 6,872,310 B2
APPLICATION NO. : 09/979782
DATED : March 29, 2005
INVENTOR(S) : Birgit Trotzki et al.

It is certified that error appears in the above-identified patent and that said Letters Patent is hereby corrected as shown below:

On the title page item [73] should read:
(73) Assignee: Boll & Kirch Filterbau GmbH Signed and Sealed this Thirtieth Day of January, 2007

JON W. DUDAS
*Director of the United States Patent and Trademark Office*